United States Patent Office 3,169,981
Patented Feb. 16, 1965

3,169,981
PROCESS FOR IMPROVING FLAVOR AND TASTE OF SOYBEAN OIL
Tsutomu Kuwata, Tokyo, Shizuo Takumi, Kamakura-shi, Kanagawa-ken, and Toshio Hashimoto, Yokohama-shi, Kanagawa-ken, Japan, assignors to Nikki Kagaku Kabushiki Kaisha, Tokyo, Japan, a corporation of Japan
No Drawing. Filed July 31, 1962, Ser. No. 213,617
Claims priority, application Japan, Dec. 12, 1961, 36/44,764
1 Claim. (Cl. 260—409)

This invention relates to a process for improving flavor and taste of soybean oil, more particularly a process for improving flavor and taste of soybean oil by selectively hydrogenating the oil in the presence of a copper chromium manganese oxide catalyst.

It has been well known that cottonseed oil is used for salad oil or other cooking oil as an excellent quality. While soybean oil may be used as salad or cooking oil, it has a peculiar odor and has an unfavorable defect of deteriorating its flavor and taste during storage, so that the quality of soybean oil is said to be much inferior to that of cottonseed oil.

The inventors have found that the defects of soybean oil abovementioned can be much improved by the partial hydrogenation of the oil by the copper chromium manganese oxide catalyst. The partial hydrogenation conditions are as follows:

Reaction temperature: 150–220° C.
Reaction pressure: Atmospheric—10 pressure
Reaction time: 30–90 minutes
Amount of catalyst to the oil: 0.1–0.2%
Iodine number of hydrogenated oil: 110–115
Percentage of linolenic acid in the hydrogenated oil: 0

The results of the inventors' analysis on the compositions of soybean oil and cottonseed oil are as follows:

| | Iodine Number | Saturated Acid Glyceride | Oleic Acid Glyceride | Linolic Acid Glyceride | Linolenic Acid |
|---|---|---|---|---|---|
| Soybean Oil | 128.01 | 14.70 | 27.65 | 54.05 | 3.60 |
| Cottonseed Oil | 115.06 | 23.33 | 24.19 | 52.48 | |

Referring, now, to the following examples the present invention will be explained in detail:

Example 1

Into an aqueous solution prepared by dissolving 126.1 g. (0.5 mole) of ammonium bichromate in 500 cc. of water, 150 cc. of 28% ammonia water was added and into the solution, a solution prepared by dissolving in 500 cc. of water 241.6 g. (1.0 mole) of crystalline copper nitrate or 249.7 g. (1.0 mole) of crystalline copper sulfate and 28.7 g. (0.1 mole) of crystalline manganese nitrate or 27.7 g. (0.1 mole) of crystalline manganese sulfate was added dropwise with stirring to form a precipitate, which was washed with water, dried, ground and roasted at 350° C. to give a catalyst.

0.1 g. of the catalyst was added into 100 g. of refined soybean oil having an iodine number of 125 and the hydrogenation was carried out for 1 hour at 180° C. in atmospheric pressure of hydrogen. The iodine number was reduced to 112 and an odor peculiar to soybean oil was removed completely and good stability during a long storage. The treated soybean oil, also, came up to the cooling test (0° C., 5½ hours) of the Japan Agriculture Standards for cottonseed salad oil.

Example 2

100 g. of refined soybean oil as in Example 1 was mixed with 0.2 g. of the catalyst prepared by the same method as in the case of Example 1 and hydrogenated for ½ hour at 200° C. in atmospheric pressure. Soybean salad oil having an iodine number of 110 was obtained and the oil passed the cooling test.

Example 3

100 g. of refined soybean oil was mixed with 0.5 g. of the catalyst and hydrogenated under the same conditions as in the case of Example 2. In these cases the hydrogenations advanced too much, which resulted in decreasing the iodine numbers to 80.56 and the treated oils did not stand the cooling test. Namely, it is clear that the suitable amount of the catalyst for the object of this invention should be 0.1–0.2%.

Example 4

Into 100 g. of refined soybean oil was added 0.05 g. of a nickel catalyst that was obtained by decomposing nickel formate in refined hardened oil at about 250° C. and the hydrogenation was carried out under the same condition as in the case of Example 2. The hydrogenation advanced too much, the iodine number was reduced to 61.70 and the treated soybean oil did not stand the cooling test.

Example 5

The results of investigating the changes in the iodine number and the compositions of soybean oil caused by the hydrogenation were as follows:

During the hydrogenation of 100 g. of refined soybean oil in the presence of 0.2 g. of the catalyst (Example 1) in atmospheric pressure of hydrogen at a temperature of 200° C., at a hydrogen flow of 1 l./min. and at an agitation of 850 r.p.m., samples were withdrawn at 0, 7, 14 and 20 min. after beginning hydrogenation and the iodine numbers, percentages of saturated acids, monoenes, dienes, and trienes in the samples were determined. The results were as follows:

| Time of hydro-genation (min.) | Appearance | Iodine number | Satd. Acids (percent) | Mono-enes (percent) | Dienes (percent) | Trienes (percent) |
|---|---|---|---|---|---|---|
| 0 | Liquid at room temp. | 219.5 | 19.2 | 21.5 | 51.8 | 7.5 |
| 7 | do | 122.3 | 21.3 | 20.2 | 55.4 | 3.1 |
| 14 | do | 117.8 | 21.7 | 23.0 | 54.2 | 1.1 |
| 20 | do | 113.7 | 20.8 | 29.2 | 50.1 | 0 |

If the above results are plotted taking the iodine number on an ordinate and triene (%) on an abscissa, they show a linear relation and the line crosses with the ordinate at about 116, which shows that the content of trienes becomes 0 when the iodine number is about 115.

In addition, the determination of dienes and trienes in the samples were made by using a ultraviolet spectrophotometer and the amounts of saturated acids and monoenes were determined by the calculation formulas in Official and Tentative Methods of the A.O.C.S., Cd 7–58 (1959). Beckman D.U. type spectrophotometer was used and the length of the cell was 1 cm.

Further, in a selective hydrogenation process for fats and fatty oils disclosed in the Japanese Patent No. 244,354, esters or fats and fatty oils containing unsaturated acids higher than linolic acid are hydrogenated in atmospheric pressure of hydrogen or lower than 10 pressure of hydrogen by using a copper chromium manganese oxide catalyst, whereby all of unsaturated fatty acids higher than linolic acid are hydrogenated into oleic acid. By an example in which the process of the above patent is applied to soybean oil (Shizuo Takumi, "Yukagaku," vol. 8, No. 6, 253–259), when 100 g. of refined soybean oil having the iodine number of 128.01 is hydrogenated for 3 hours at 200° C. with the addition of 2 g. of a copper chromium manganese oxide catalyst, the iodine number is reduced to 72.14. The invention of the present application, however, different from the above process that in this hydrogenation process, all of the linolenic acid is hydrogenated to linolic acid and the hydrogenation of linolic acid to oleic acid is suppressed by using copper chromium manganese oxide catalyst.

We claim:

A process for improving flavor and taste of soybean oil which comprises hydrogenating refined soybean oil in the presence of a copper chromium manganese oxide catalyst under a hydrogen pressure of one atmosphere, at a temperature of 150–220° C. there being present from 0.1 to 0.2% by weight of said catalyst based on the weight of the refined soybean oil so as to reduce the iodine number of the soybean oil to 110–115 and to reduce the content of lineolenic acid to zero.

References Cited in the file of this patent
UNITED STATES PATENTS

| | | |
|---|---|---|
| 1,844,857 | Larson | Feb. 9, 1932 |
| 2,302,994 | Gwynn | Nov. 24, 1942 |

FOREIGN PATENTS

| | | |
|---|---|---|
| 670,906 | Great Britain | Apr. 30, 1952 |